United States Patent Office 2,950,750
Patented Aug. 30, 1960

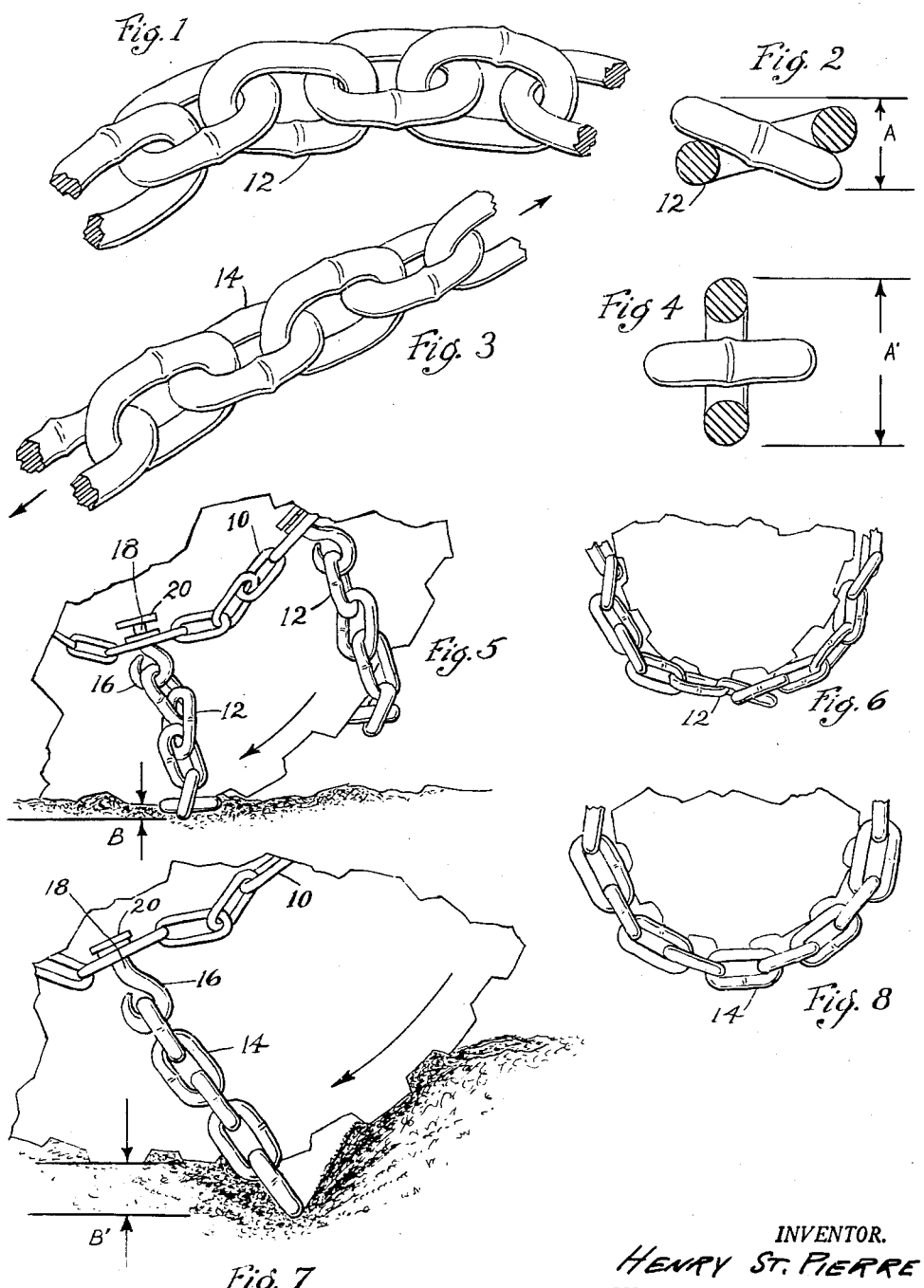

2,950,750
TRACTION CHAIN FOR VEHICLES
Henry St. Pierre, 50 Frank St., Worcester, Mass.
Filed Nov. 19, 1956, Ser. No. 623,179
1 Claim. (Cl. 152—231)

This invention relates to a new and improved tire chain particularly adapted for the wheels of vehicles such as automobiles, trucks and tractors.

The principal object of the invention resides in the provision of cross-chains made of straight, non-twisted links which are adapted to extend across the tread of a vehicle wheel or tire, each cross-chain having its ends connected to the side chains or walls of the tire chain, wherein said cross-chains are made of straight welded links which are not twisted and which have the property of rising in height automatically as to alternate links, upon tension being applied thereto, as for instance when the tire chain is being operated in mud or snow as distinct from when running on a bare pavement.

Further objects of the invention include the provision of a tire chain as above described wherein the cross-chains are arranged in a fairly snug but untensioned relation with respect to the tire tread and being composed of straight welded links, the same tending to fall into as close as possible parallelism with each other so that when running under untensioned conditions such as on a bare pavement, there is a minimum of bumping and impact between the chains and the pavement, said chains, however, when being engaged in mud or relatively deep snow having a drag applied thereto, which provides a tension from end-to-end of the cross-chains and causes the individual links thereof to extend into normal or substantially right-angular position with respect to adjacent links, whereby the chains themselves dig deeply into the mud or snow in a manner distinct from that occasioned when riding on bare pavement; and including the provision of a swivel connection for said cross-chains at each end thereof for connection to the side walls whereby said chains may swivel bodily upon the treads of the tires to which they are engaged.

Other objects and advantages of the invention will appear hereinafter.

Reference is to be had to the accompanying drawings, in which

Fig. 1 is a perspective view of a cross-chain according to the present invention in untensioned form;

Fig. 2 is a sectional view illustrating the cross-chains of Fig. 1;

Fig. 3 is a view similar to Fig. 1 but showing the chains tensioned;

Fig. 4 is a section illustrating the chain in the form of Fig. 3;

Fig. 5 illustrates the chain applied to a vehicle and riding on a bare pavement;

Fig. 6 is an end view illustrating the chain in the condition of Fig. 5;

Fig. 7 is a view similar to Fig. 5 but illustrating the action thereof in deep mud; and Fig. 8 is a view similar to Fig. 6 but illustrating the chain as disposed in Fig. 7.

In this case, the side walls or side-chains 10 may be substantially conventional and these serve to hold between them the novel cross-chains which are generally indicated in their untensioned condition at 12 and in their tensioned condition at 14.

Each cross-chain is provided with a swivel hook 16 at each end thereof, these hooks including a shank portion 18 that extends through an individual link in side wall 10, with a head or the like 20 thereon to prevent escape of the swivel hook.

By this construction, the individual cross-chains may rotate on their own axes and as the tire progresses, the chains will be seen to rotate as stated rather than being fixed with relation to the side walls as in the prior art.

It will be seen that the links of the cross-chains are straight welded links and they are not twisted as is shown in the prior art. The straight links, in combination with the swivels at 18, provide for a novel construction and operation of the tire chain.

As has been clearly shown in Figs. 1, 2, 5 and 6, the straight chains, when driving on bare pavement, have a slight amount of laxity, i.e., they are not under tension of any kind, and for this reason they tend to fall into the closest association possible which is indicated in Fig. 2. In this condition, the links are closely adjacent each other to provide for the minimum amount of height indicated by the reference character A, between the tread of the tire and the pavement, see B in Fig. 5.

This provides for a minimum of bumping and shock which is always the result of the pounding of chains on a bare pavement and for this reason the present chain will be easier to ride on and longer-lasting than conventional twist link chains. It is also to be noted that the crosschains, by being capable of rotation bodily, will wear evenly at both sides thereof and will not wear merely on one side as is the case in the prior art.

However, when conditions of deep snow or mud are encountered as shown in Fig. 7, or when skidding on ice, the chains being originally somewhat loose, have imparted thereto a drag which occasions the application of tension on the cross-chain, so that they are in effect stretched as much as possible from the ends thereof as illustrated by the arrows in Fig. 3.

This results in the alternate links extending out normally or at right angles to each adjacent link as is clearly shown in Figs. 4 and 8 and this in turn clearly provides a much greater height A' between the tread of the tire and the outermost points of the cross-chains.

This is illustrated at B' in Fig. 7 which also shows how these chains automatically dig deeper into the mud and snow when encountering such conditions, while at the same time providing for a quieter and less extensive operation when running on a bare pavement.

Having thus described my invention and the advantages thereof, I do not wish to be limited to the details herein disclosed, otherwise than as set forth in the claim, but what I claim is:

Tire chain comprising cross-chains and connected side chains, each cross-chain including a length of straight non-twisted links adapted to lie substantially flat when loose and alternately at right angles to each other when tensioned by use in mud or snow, and swivel connections for each cross-chain with relation to the side chains whereby the cross-chains may rotate relative to the side chains.

References Cited in the file of this patent
UNITED STATES PATENTS

| 1,362,851 | Cox | Dec. 21, 1920 |
| 2,415,583 | Eddy | Feb. 11, 1947 |
| 2,451,761 | Miller | Oct. 19, 1948 |